(12) United States Patent
Xiong et al.

(10) Patent No.: US 10,291,448 B2
(45) Date of Patent: May 14, 2019

(54) MULTI-CARRIER SUPERPOSITION METHOD AND DEVICE

(71) Applicant: DATANG MOBILE COMMUNICATIONS EQUIPMENT CO., LTD., Beijing (CN)

(72) Inventors: Jun Xiong, Beijing (CN); Huarong Sun, Beijing (CN); Bin Xue, Beijing (CN); Jieli Wang, Beijing (CN); Jintao Chen, Beijing (CN); Pengpeng Zhang, Beijing (CN); Bin Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 78 days.

(21) Appl. No.: 15/515,214

(22) PCT Filed: Sep. 21, 2015

(86) PCT No.: PCT/CN2015/090192
§ 371 (c)(1),
(2) Date: Mar. 29, 2017

(87) PCT Pub. No.: WO2016/050148
PCT Pub. Date: Apr. 7, 2016

(65) Prior Publication Data
US 2017/0222851 A1    Aug. 3, 2017

(30) Foreign Application Priority Data
Sep. 29, 2014 (CN) .......................... 2014 1 0514549

(51) Int. Cl.
*H04L 5/00* (2006.01)
*H04L 5/02* (2006.01)
(Continued)

(52) U.S. Cl.
CPC .............. *H04L 27/26* (2013.01); *H04L 5/001* (2013.01); *H04L 5/023* (2013.01); *H04L 27/183* (2013.01);
(Continued)

(58) Field of Classification Search
CPC ... H04L 27/183; H04L 27/26; H04L 27/2604; H04L 27/2621; H04L 27/2623; H04L 5/001; H04L 5/023
See application file for complete search history.

(56) References Cited

U.S. PATENT DOCUMENTS

| 4,800,364 A | * | 1/1989 | Mortara | .............. | H03M 1/0639 |
| | | | | | 341/131 |
| 2002/0057218 A1 | * | 5/2002 | Smith | ...................... | H04B 7/10 |
| | | | | | 342/365 |

(Continued)

FOREIGN PATENT DOCUMENTS

| CN | 101262628 A | 9/2008 |
| CN | 102118846 A | 7/2011 |

(Continued)

OTHER PUBLICATIONS

Nov. 26, 2015 Search Report issued in International Patent Application No. PCT/CN2015/090192.
Nov. 26, 2015 Written Opinion issued in International Patent Application No. PCT/CN2015/090192.

*Primary Examiner* — Kashif Siddiqui
(74) *Attorney, Agent, or Firm* — Oliff PLC

(57) ABSTRACT

Disclosed are a multi-carrier superposition method and device. First, input carrier signals are superposed, and gain reduction processing is conducted during the superposition process, and then CFR processing and increase processing are conducted on the superposed carrier signals. Thus, under the circumstance of multi-carrier superposition, it can be effectively ensured that signals cannot overflow, and mean- (Continued)

while the requirement for precision of a system during processing is met.

8 Claims, 5 Drawing Sheets

(51) Int. Cl.
*H04L 27/18* (2006.01)
*H04L 27/26* (2006.01)

(52) U.S. Cl.
CPC ...... *H04L 27/2604* (2013.01); *H04L 27/2623* (2013.01); *H04L 27/2621* (2013.01)

(56) References Cited

U.S. PATENT DOCUMENTS

2003/0063683 A1* 4/2003 MacFarlane Shearer, III ............ H04L 25/03834 375/295
2003/0119473 A1* 6/2003 Smith .................. H03D 7/1441 455/326
2006/0284818 A1* 12/2006 Tomita ................. G09G 3/2059 345/98
2010/0322361 A1* 12/2010 Han ...................... H04B 1/001 375/345

FOREIGN PATENT DOCUMENTS

| CN | 102299883 A | 12/2011 |
| CN | 104283833 A | 1/2015 |
| EP | 2378732 A2 | 10/2011 |

* cited by examiner (a) Continuous carrier aggregation (b) Discontinuous carrier aggregation

MULTI-CARRIER SUPERPOSITION METHOD AND DEVICE

This application claims the benefit of priority from Chinese Patent Application No. 1, 201410514549.2, filed on Sep. 29, 2014, and entitled "Multi-carrier superposition method and device", the entire contents of which are hereby incorporated into the present application by reference.

TECHNICAL FIELD

The present invention relates to the field of communication technology, and particularly to a multi-carrier superposition method and device.

BACKGROUND TECHNOLOGY

As shown in FIG. 1, in the existing carrier superposition technology, FPGA (field programmable gate array) delivers the following scaled power signal to the DAC (digital-to-analog converter): −(Full Scale) XdB (i.e. XdBFS), and the power of the baseband signal from BBU (baseband processing unit) is −XdBFS, and the gain of DUC (digital up conversion), CFR (crest factor reduction), and DPD (digital pre-distortion) is ZdB. Baseband data length shall be considered as 16 bits. In TD-LTE (Time Division Long Term Evolution) network, considering TD-LTE has high peak-to-average ratio (PAR), small number of carriers, and wide signal band, thus the signal power of it is considered to be −XdBFS.

The peak to average ratio (PAR) of the signal after DUC/CFR is about TdB. The peak amplitude of the output signal is boosted by the DPI) in order to correct the peak distortion of the amplifier. Based on the improvement of the DPD algorithm, the output power of the amplifier can be made to contain P-3 dB, which can increase the peak power of the signal 3 dB after DPD, and keep the average power unchanged. The scaled amplitude of the maximum transmitter output power FPGA to DAC interface is −XdBES.

As more carriers are superposed, as shown in FIG. 2 of multi-carrier superposition, system like LTE-ADVANCED shall support the combination of up to five 20 MHz LTE carriers, where the signal peak-to-average ratio (PAR) probably shall increase. After multi-carrier superposition, peak truncation is usually performed. Before digital superposition, it should be ensured that the power of all the superposed signals is equal to the scaled value. Although DUC/CFR does not introduce gain variation, but as the number of carriers increases, the PAR of the signal may exceed the scaling value −XdBFS, which can cause signal overflow even before CFR, thus undermining signal quality. Since this device does not have saturation processing, it will soon damage the out-of-band signal quality Adjacent Channel Power Ratio (ACPR) and the in-band signal quality Error Vector Magnitude (EVM). Since this method of direct truncation at the peak amplitude shall cause the biggest signal fluctuation, which may cause these signals change from maximum value to minimum value, or change of signal sign, thus leading to signal mutation, which consequently affect EVM and ACPR of the signal.

FIG. 3 is the diagram of multi-carrier superposition overflow determination process in the existing technology which does not have saturation processing. It can be seen that, as the number of carrier increases, the peak-to-average ratio of the signal will be higher and higher, and the superposed carrier signal can easily overflow. In this case, if each carrier is scaled too low, the accuracy will be lost; yet if the scaling is reasonable, the multi-carrier superposition will cause signal overflow. Therefore, how to solve the problem of signal overflow after multi-carrier superposition in the existing technology becomes a technical problem urgently need to be solved by professionals in this field.

INVENTION SUMMARY

With the development of the multi-carrier superposition technology, the signal PAR is lifted after multi-carrier superposition, and the scaling value of the physical layer can't meet the requirements, which will lead to signal overflow and thus damaging signal quality. In order to reduce the risk of signal overflow caused by multi-carrier superposition, this invention provides a multi-carrier superposition method, which comprises of:

Superpose the inputted carrier signals, and conduct gain reduction during the superposition process;

Conduct CFR processing on the superposed signal;

Conduct increase processing on the carrier signal subjected to CFR processing to raise the total power of the carrier signal.

Accordingly, the present invention also provides a multi-carrier superposition device which comprises of:

A superposition processing module for superposing the inputted carrier signals and conduct gain reduction during the superposition process;

A CFR processing module for conducting CFR processing on the superposed carrier signal;

An increasing module for lifting the carrier signal after CFR processing, so as to raise the total power of the carrier signal.

Thus, by applying the technical solution of the present invention, the input carrier signals are first superposed, and gain reduction is conducted during the superposition process, then CFR processing and increase processing are conducted on the superposed carrier signals. So in the event of multi-carrier superposition, it can be effectively ensured that the signal will not overflow, while meeting precision requirements of the system during the processing.

DIAGRAM DESCRIPTION

DETAILED IMPLEMENTATION

Figure 1:
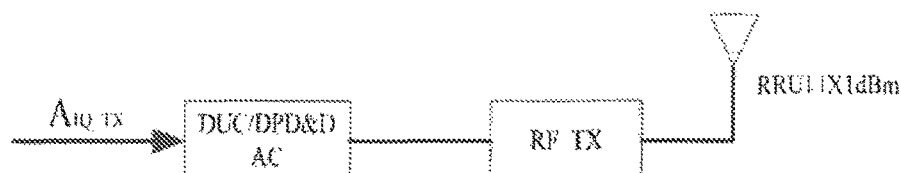
FIG. 1 is a schematic diagram of a TX working path in the prior art.
Figure 2:
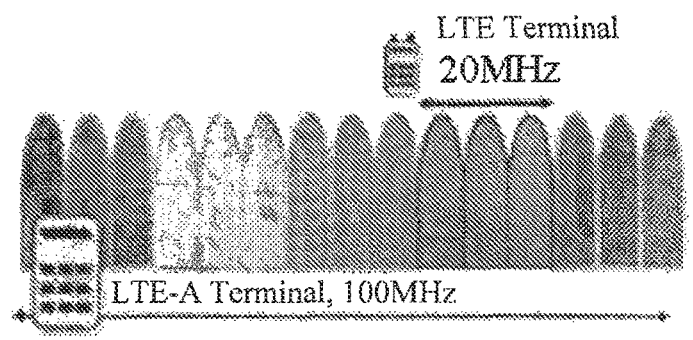
FIG. 2 is a schematic diagram of a multi-carrier superposition in the prior art.
Figure 2:
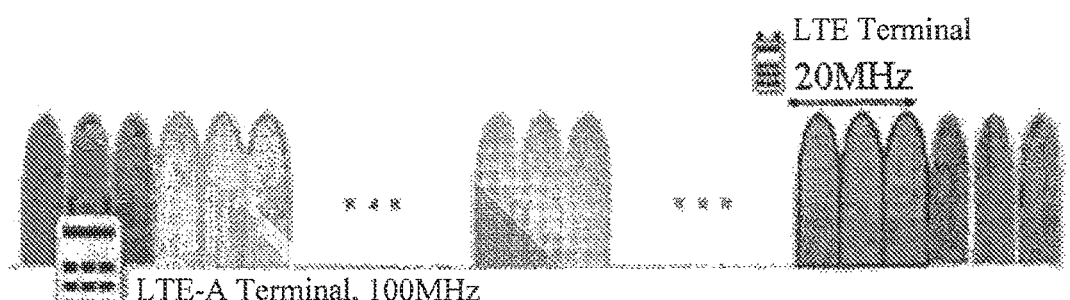
Figure 3:
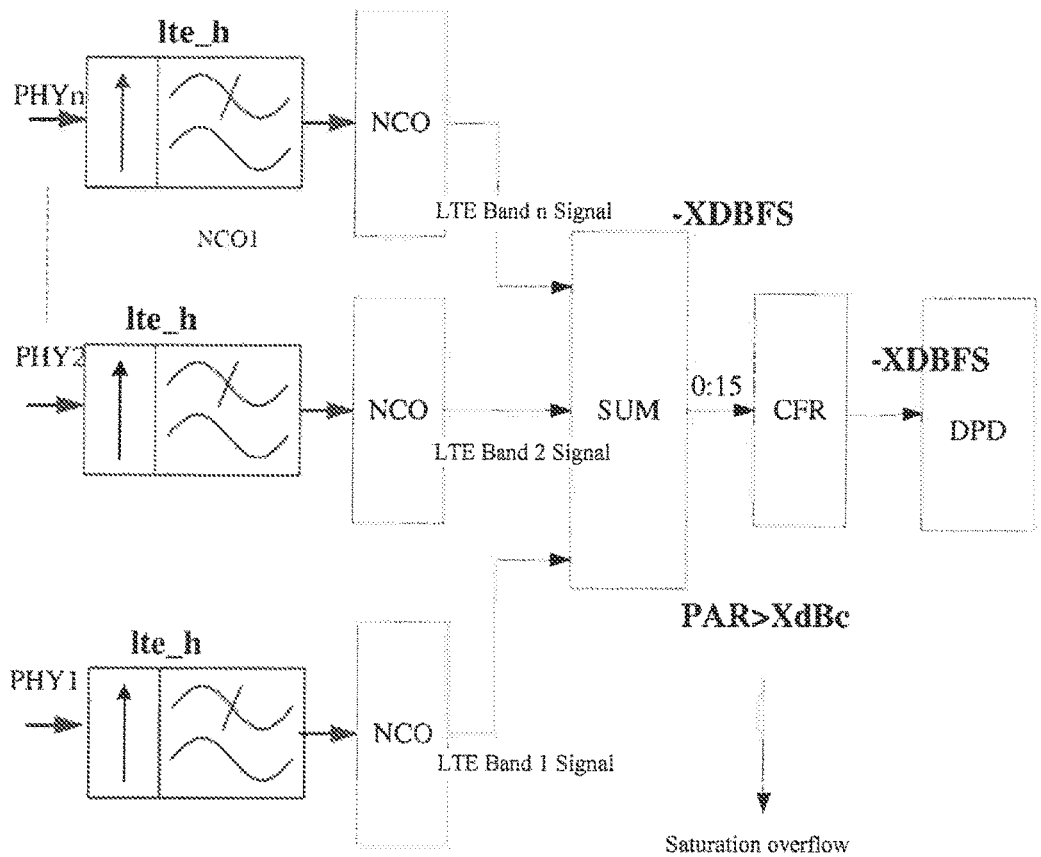
FIG. 3 is a schematic diagram of multi-carrier superposition overflow decision process in the prior art with no saturation processing.
Figure 4:
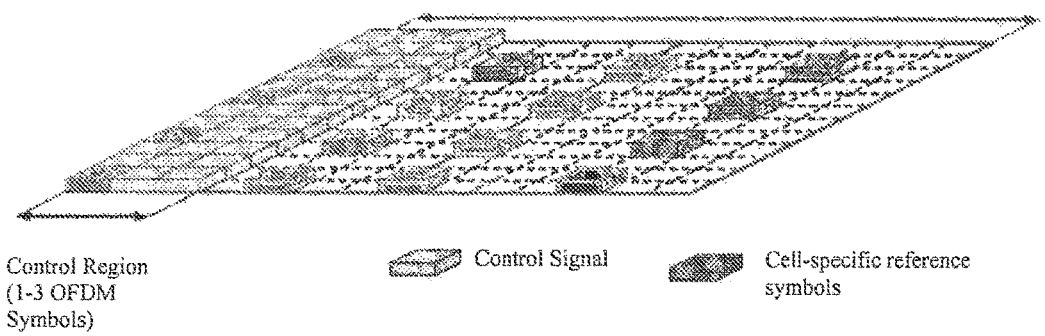
FIG. 4 is a diagram illustrating UE time and frequency domain description of the control region and the data region of a sub-frame in the embodiment of the present invention.

As described in the background technology, in order to solve the problem of signal overflow after multi-carrier superposition in the prior art, in the design solution of multi-carrier rotation and signal scaling reduction/increase proposed in the present invention, each downlink sub-frame is first divided into 2 parts: the Control Region and the Data Region, both of them are subject to certain rules according to the provisions of the 36.211 protocol. As shown in FIG. 4, the contents and functions of each region are as follows:

Control Region: This region is mainly used for Layer 1 and Layer 2 control signaling (L1/L2 control signaling). It is composed of PCFICH (Physical Control Format indicator Channel), PHICH (Physical HARQ (Hybrid Automatic Repeat reQuest) Indicator Channel), PDCCH (Physical Downlink Control Channel), and Reference Symbol. Wherein the Reference Symbol comprises of downlink cell-specific reference signal, PSS (primary synchronization signal), and SSS (secondary synchronization signal).

Data Region: includes PDSCH (Physical Downlink Shared Channel) and cell-specific reference signal.

The cell-specific reference signal has a certain distribution in both the Data Region and the Control Region, and exhibits a similar numerical distribution on different carriers. Therefore, after multi-carrier superposition, at the position of pilot symbols contained in a sub-frame, it will randomly show a large peak to average ratio (PAR). At the same time, the Control Region shall send control information when UE is accessing the cell.

Specifically, the downlink control signal used and its procedure when. UE is accessing the cell are as follows:

a) When UE is powered on, it will receive data at several center frequency points where there may exist LTE cells and calculate the bandwidth RSSI. The received signal strength is used to judge whether there is a cell around the frequency point.

b) UD receives PSS and SSS around the center frequency in the previous step. The two signals and system bandwidth are unrestricted, the configuration is fixed, and the signal itself repeats in 5 ms cycles. In addition, PSS is in ZC sequence, SSS is in M sequence, which are strongly correlated, so it can be directly detected and received. Based on which, cell ID can be obtained, and the 5 ms boundary of cell timing can be obtained at the same time.

c) After the 5 ms boundary is obtained, according to the time-frequency position of the PBCH, the sliding window method is used to perform blind detection. If the CRC check result is correct, it means the current sliding window is the 10 ms frame boundary and can receive PBCH (Physical Broadcasting Channel), since the PBCH signal is present in each slot #1 and is in 10 ms cycle; then the information of system frame number, bandwidth, and PHICH configuration can be obtained from the content of PBCH; once the UE can read PBCH and the receiver retains the data of the entire sub-frame in advance, the UE can also read PHICH and PCIFICH information of fixed position at the same time.

d) At this point, the UE achieves timing synchronization with an eNB (evolved NodeB); but to complete the cell search, it is not sufficient just to receive PBCH, it is also needed to receive SIB (System Information Block), i.e., the UE need to receive BCCH (Broadcast Control Channel) information carried on PDSCH. To do this, the following steps need to be taken:

a)' Receive PCFICH. The time-frequency resource of this channel is fixed and known at this point, so the symbol number of PDCCH can be received and parsed. Search PDCCH and conduct decoding;

b)' In general, there may be multiple PDCCHs within one sub-frame. The UE first needs to demodulate the DCI (Downlink Control Information) in PDCCH before it can demodulate the PDSCH (including broadcast messages, paging, UE data, etc.) belonging to the UE itself at the corresponding resource location. At this point all channel information has been obtained. From the above description, it can be seen that when the UE conducts cell search, if the control information of multi-carriers is transmitted synchronously, a relatively large peak-to-average ratio (PAR) will also be caused by the peak-to-peak superposition.

Figure 5:
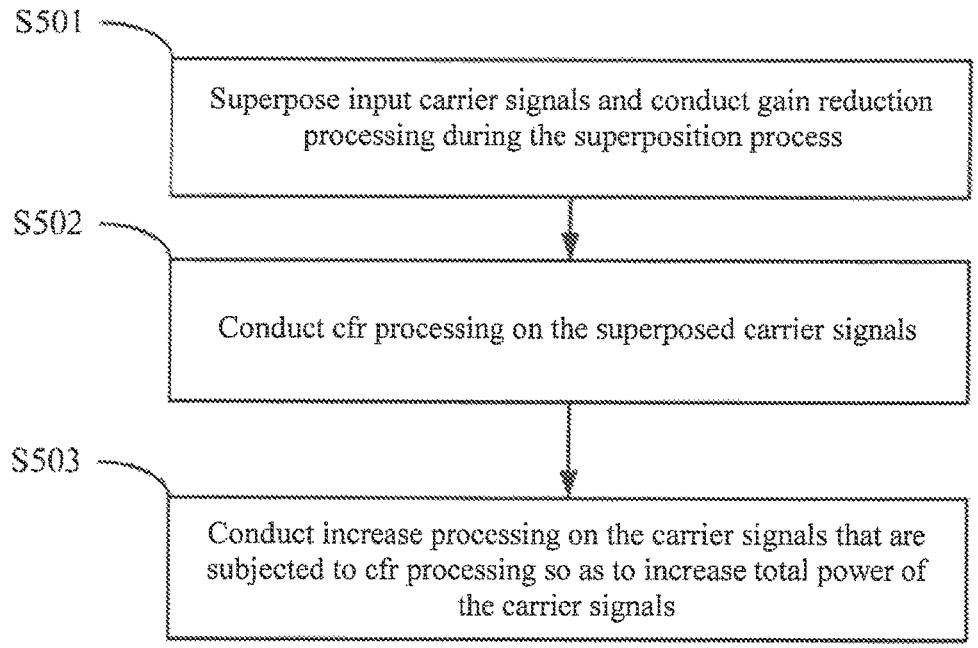
FIG. 5 is a schematic diagram of a multi-carrier superposition method according to the present invention.

FIG. 5 is the flow chart of a superposition method proposed in the present invention, which includes the following steps:

S501, superpose input carrier signals, and conduct gain reduction processing during the superposition process.

S502, conduct CFR processing on the superposed carrier signals.

S503, conduct increase processing on the carrier signals that are subjected to CFR processing so as to increase total power of the carrier signals.

As described above, in order to overcome the high PAR due to peak-to-peak superposition of the multi-carrier reference signals and control signals, it is necessary to conduct nonlinear rotation for the multi-carrier one by one before step S401. Before multi-carrier aggregation, rotation of certain phase must first be performed on each carrier. Non-linear phase rotation shall be used in phase selection, with the phase rotation formula as follows:

$$\phi_k = \frac{\pi(k)^R}{(N-1)}, R \geq 1$$

The cases for R=2 are as follows:

$$p = \exp\left(\frac{j\pi k^2}{N}\right) = \exp(j\phi_k), \text{ for } k = 0, 1, \ldots, N-1$$

The above algorithm is a non-linear phase pre-rotation. It is used to reduce the elevated. PAR caused by reference signal and control signal peak-to-peak superposition. Through the above mentioned nonlinear rotation, correlation between the reference signal and the control signal in the multi-carrier can be reduced, thereby reducing the PAR of the reference signal in the multi-carrier signal. However, the PAR of the Data Region is randomly distributed, therefore, it is not possible to reduce PAR in this way. In order to prevent the peak power of the signal from exceeding the scaling threshold after multi-carrier superposition, on the basis above, an additional algorithm device shall be used to first reduce signal amplitude, and then resume it after the peak-truncating process. The above three schemes not only can guarantee signal accuracy, but also avoid lowering accuracy of signal superposition:

Scheme 1: reduce preset amplitude for the inputted carrier signals; conduct multicarrier filtering and frequency shifting processing on the multi-carrier signals with reduced amplitudes; superpose the carrier signals after multi-carrier filtering and frequency shifting processing.

Figure 6:
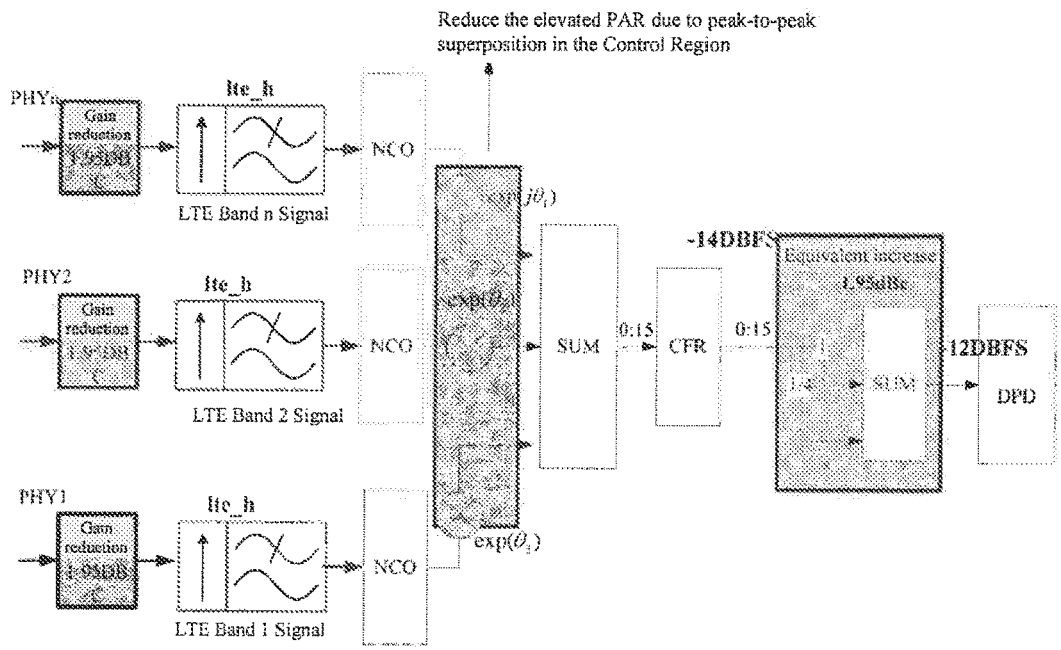
FIG. 6 is a schematic diagram of the truncation/superposition processing after multi-carrier superposition, which is proposed in Embodiment 1 of the present invention.

Specifically, this scheme shall reduce the amplitude of each input carrier signal, and the magnitude of the reduction shall facilitate the increase processing later. The proposed gain reduction is tabc=20*10(1+1/2^N); generally N can be set to N=1, 2, 3. Thus, the magnitudes of reduction are as follows:

$tdbc=20*\log 10(1+1/2^1)=3.52;$ $tdbc=20*\log 10(1+1/2^2)=1.94;$ $tdbc=20*\log 10(1+1/2^3)=1.02;$ FIG. 6 illustrates the method of $20*\log 10(1+1/2^2)^t$ gain reduction. First conduct tdbc gain reduction to each multi-carrier input signal, then conduct multi-carrier filtering, frequency shifting, and CFR processing after superposition. After CFR processing is completed, since the peak has been truncated, so raise the total power again to keep the overall scaling of the signal. The advantage of this scheme is that for signals which have gone through gain reduction, it can simply be implemented by shifting truncated NBIT and then add it to the original signal. FIG. 6 shows the implementation case that the gain of baseband signal for each carrier be lowered when they are inputted, so that the total power after the multi-carrier aggregation is reduced, and the peak power is also reduced, so that the peak power shall not overflow while keeping the data bit length unchanged. The peak power is reduced after peak truncation, and then adjust the gain to restore the normal power scaling.

Scheme 2: Conduct multi-carrier filtering and frequency shifting for each of the input carrier signals; superpose the carrier signals subjected to the multicarrier filtering and frequency-shifting processing, and conduct gain reduction processing for the superposed multi-carrier signal.

Specifically, this scheme need to reduce signal amplitude after multi-carrier superposition, the multi-carrier signal is first subjected to the tdbc gain reduction processing for each carrier, then go through multi-carrier filtering, frequency shifting, superposition, and subsequently undergo CFR processing. After CFR is completed, since the peak has been truncated, the total power is raised again so that the scaling of the overall signal keeps unchanged and the signal does not overflow.

Figure 7:
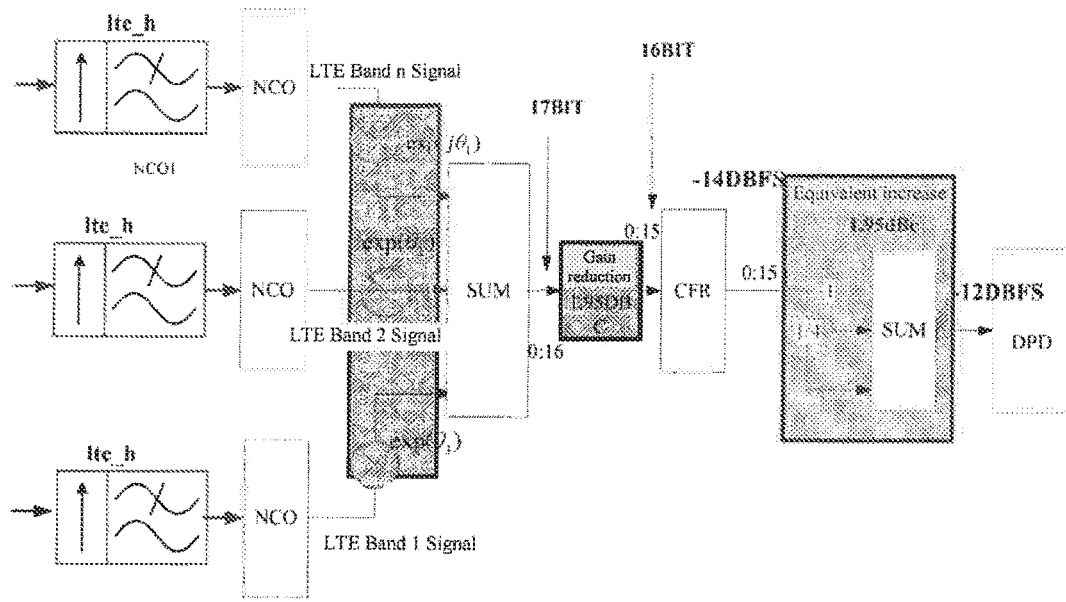
FIG. 7 is a schematic diagram of the truncation/superposition processing after multi-carrier superposition, which is proposed in Embodiment 2 of the present invention.

As shown in FIG. 7, the multi-carrier input signal is first subjected to multi-carrier filtering, frequency shifting and superposition processing, then the multi-carrier signal amplitude is reduced, then conduct CFR processing. After CFR is completed, since the peak has been truncated, the total power is raised again so that the scaling of the overall signal remains unchanged and the signal does not overflow. Compared to the first scheme, the scheme can reduce the amplitude of the signal after the multi-carrier superposition, while save the AGC regulator and reduce loss of signal precision at the same time. For the implementation case of FIG. 7, after multi-carrier aggregation, the bit width is added 1 bit to 17 bits to ensure peak signal will not overflow, and the IF gain can be adjusted lower to reduce peak power. Then remove the 1 bit that was added earlier, which shall not cause overflow, and maintain the number of bits unchanged for later processing. After peak truncation the peak power shall be lowered, then adjust the gain to resume normal power scaling.

Scheme 3: Conduct multi-carrier filtering and frequency shifting processing on the inputted carrier signals; superpose the carrier signals subjected to multi-carrier filtering and frequency shifting processing, and increasing the bit width of the multi-carrier signal after superposition is completed.

Figure 8:
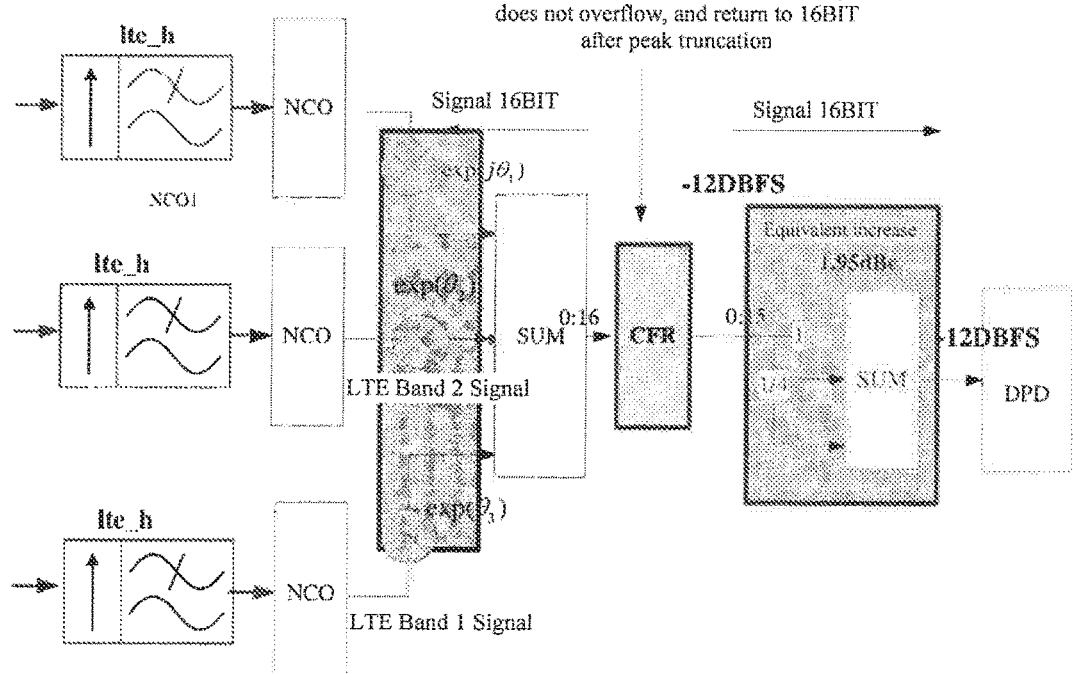
FIG. 8 is a schematic diagram of the CFR processing on long bit-length after multi-carrier superposition, which is proposed in Embodiment 3 of the present invention.

As shown in FIG. 8, by increasing the bit width after multi-carrier superposition, this scheme removes the processing of gain increase and decrease. The advantage of this processing method is that CFR processing does not degrade accuracy, and AGC regulator can be omitted. But the bit width and complexity of CFR processing need to be increased correspondingly. In the implementation case of FIG. 8, after multicarrier aggregation, the bit width is increased by 1 bit to 17 bits, to ensure that the peak signal does not overflow. The input processing bit width of the peak truncation module (CFR) is increased by 1 bit. After peak truncation the peak power shall be lower, and the output bit width is restored to 16 bits.

All the above three schemes reduce the PAR of the reference signal through non-linear phase rotation, reduce signal overflow that may be caused by multi-carrier superposition through amplitude adjustment, and resume signal scaling after peak truncation is completed. In this way, not only the problem of PAR is too high after multi-carrier superposition can be resolved, it can also guarantee that the signal does not overflow.

Figure 9:
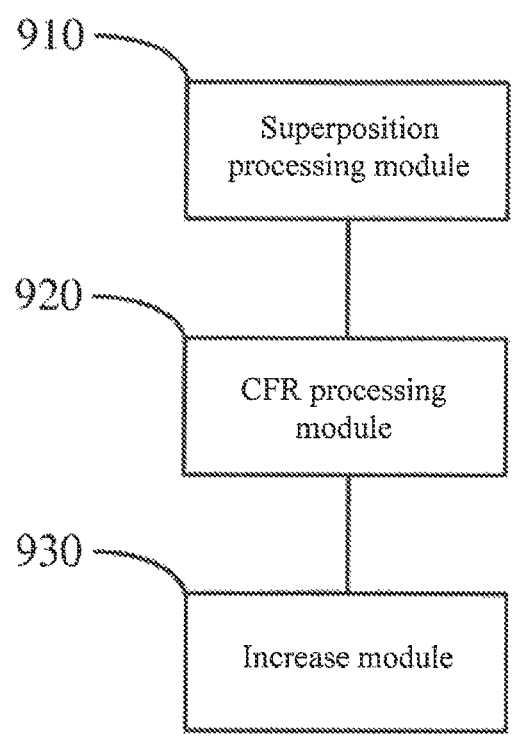
FIG. 9 is a diagram showing the structure of a multi-carrier superposition device proposed in the present invention.

In order to achieve the above technical object, the present invention also proposes a multi-carrier superposition device, as shown in FIG. 9, which comprises:

Superposition processing module 910 for superposing the inputted carrier signals and performing gain reduction during the superposition process;

CFR processing module 920 for performing CFR processing on the superposed carrier signal;

Increase processing module 930 for raising the carrier signal after CFR processing to lift the total power of the carrier signal.

In a specific application scenario, the superposition processing module is specifically used to reduce the inputted carrier signals by a predetermined amplitude, perform multi-carrier filtering and frequency shift processing on the reduced carrier signals, and superpose the carrier signals that have gone through the multicarrier filtering and frequency shifting.

In a specific application scenario, the above mentioned superposition processing module is specifically used to perform multi-carrier filtering and frequency-shifting processing on each input carrier signal, and conduct superposition to each carrier signal subjected to multi-carrier filtering and frequency-shifting processing, and then perform reduction processing for the multi-carrier signals after superposition is completed.

In a specific application scenario, the superposition processing module is specifically used to conduct multi-carrier filtering and frequency shifting processing on each input carrier signal, superpose each carrier signal subjected to multi-carrier filtering and frequency shifting processing, and increases the bit width of the multi-carrier signal after superposition is completed.

In a specific application scenario, it also includes:

A rotation processing module for acquiring input carrier signals and performing non-linear rotation processing for each of them one by one.

By applying the technical solutions of the present invention, the input carrier signals are first superposed, and gain reduction processing is performed during the superposition, and then CFR processing and increase processing are performed on the superposed carrier signals. In this way, during multi-carrier superposition, it can be effectively ensured that the signal will not overflow, while meeting system requirements for precision during the processing.

From the above description of the implementation cases, it will be apparent to those skilled in the art that the present invention can be implemented by hardware, or by means of software plus the necessary general hardware platform. Based on this understanding, the technical solution of the present invention can be embodied in the form of a software product which can be stored in a non-volatile storage medium (which may be a CD-ROM, a USB disk, a mobile hard disk, etc.), including a certain amount of program instructions, which can be used to cause a computer device (which may be a personal computer, a server, or a network device, etc.) to execute the method described in the various embodiments of the present invention.

It is to be understood by those skilled in the art that the drawings are merely schematic views of a preferred implementation scenario, and that the modules or processes in the drawings are not necessarily essential to the implementation of the present invention.

It is to be understood by those skilled in the art that modules in a device in an implementation case may be distributed among devices in accordance with implementation case description, or may be adapted to one or more devices different from the present implementation scenario. The modules of the implementation scenario described above may be combined into one module or may be further divided into a plurality of sub-modules.

The serial numbers of the present invention are for descriptive purposes only, and do not represent the merits of implementation scenario.

While only a few specific implementation scenarios of the invention have been disclosed above, the invention is not limited thereto and any changes that one skilled in the art can contemplate fall within the scope of protection for the present invention. It is to be understood by those skilled in the art that embodiments of the present invention may be provided as a method, a system, or a computer program product. Thus, the present invention may take the form of a full hardware embodiment, a full software embodiment, or an embodiment combining software and hardware. Moreover, the invention may take the form of a computer program product implemented on one or more computer usable storage media (including but not limited to disk storage, CD-ROM, optical storage, etc.) containing computer usable program code therein.

The present invention is described with reference to flowcharts and/or block diagrams of a method, device (system), and computer program product according to an embodiment of the present invention. It is to be understood that each process and/or block in the flowchart and/or block diagrams, as well as combinations of processes and/or blocks in the flowcharts and/or block diagrams, may be implemented by computer program instructions. These computer program instructions may be provided to a processor of a general purpose computer, a special purpose computer, an embedded processor, or other programmable data processing device to generate a machine, such that instructions generated by a processor of a computer or other programmable data processing device can produce a device that can achieve the functions specified in one or a plurality of processes in the flowcharts and/or one or a plurality of blocks in the block diagrams.

The computer program instructions may also be stored in a computer readable memory capable of directing a computer or other programmable data processing apparatus to operate in a particular manner such that the instructions stored in the computer readable memory produce an article comprising instruction devices, which can implement the function specified in one or a plurality of processes in the flowcharts and/or one or a plurality of blocks in the block diagrams.

These computer program instructions may also be loaded onto a computer or other programmable data processing device, such that a series of operation steps are performed on a computer or other programmable device to generate computer-implemented processing for execution on a computer or other programmable device. The instructions executed on the computer or other programmable device shall provide the steps for implementing the functions specified in one or a plurality of processes in the flowcharts and/or one or a plurality of blocks in the block diagrams.

Although preferred embodiments of the present invention have been described, those skilled in the art will be able to make other changes and modifications to the basic embodiments once they become aware of the inventive concepts. Therefore, it is intended that the appended claims be interpreted as including preferred embodiments and all changes and modifications that fall within the scope of the invention.

It will be apparent to those skilled in the art that various modifications and changes can be made in the embodiments of the present invention without departing from the spirit and scope of the embodiments of the present invention. Thus, it is intended that the present invention encompasses such modifications and changes to the embodiments of the present invention provided they come within the scope of the appended claims for the invention and its equivalent technologies.

The invention claimed is:

1. A multi-carrier superposition method, comprising:
   superposing inputted carrier signals in a superposition process, and conducting gain reduction processing during the superposition process;
   conducting crest factor reduction (CFR) processing on the superposed carrier signals; and
   conducting increase processing on the carrier signals that are subjected to CFR processing so as to increase total power of the carrier signals,
   wherein before superimposing the input carrier signals, the method further comprises:
      obtaining the inputted carrier signals; and
      conducting non-linear rotation processing on each of the carrier signals.

2. The method as in claim 1, wherein superposing the input carrier signals and conducting gain reduction processing comprise:
   reducing the input carrier signals by a preset amplitude;
   conducting multi-carrier filtering and frequency shifting processing on the reduced carrier signals; and
   superposing the carrier signals subjected to multi-carrier filtering and the frequency shifting processing.

3. The method as in claim 1, wherein superposing the input carrier signals and conducting gain reduction processing comprise:
   conducting multi-carrier filtering and frequency shifting on the inputted carrier signals; and
   superposing the carrier signals subjected to multi-carrier filtering and the frequency shifting processing, and reduce amplitude of the carrier signals after superposition.

4. A multi-carrier superposition method, comprising:
   superposing inputted carrier signals in a superposition process, and conducting gain reduction processing during the superposition process;
   conducting crest factor reduction (CFR) processing on the superposed carrier signals; and
   conducting increase processing on the carrier signals that are subjected to CFR processing so as to increase total power of the carrier signals, wherein superposing the input carrier signals and conducting gain reduction processing comprise:
conducting multi-carrier filtering and frequency shifting processing on the inputted carrier signals; and
superposing the carrier signals subjected to multi-carrier filtering and frequency shifting processing, and increasing bit width of the carrier signals after superposition.

5. A multi-carrier superposition device, comprising:
a controller that is configured to function as:
a superposition processing module that superposes the inputted carrier signals and conducts gain reduction processing during a superposition process;
a CFR processing module that conducts crest factor reduction (CFR) processing on the superposed carrier signals; and
an increase module that increases the carrier signals after CFR processing, to raise total power of the carrier signals; and
a rotation processing module that acquires input carrier signals and performs non-linear rotation processing on each of the carrier signals.

6. The device as in claim 5, wherein the superposition processing module reduces the inputted carrier signals by a preset amplitude, conducts multi-carrier filtering and frequency shifting processing on the reduced carrier signals, and superposes the carrier signals subjected to multi-carrier filtering and frequency shifting processing.

7. The device as in claim 5, wherein the superposition processing module conducts multi-carrier filtering and frequency shifting processing on the inputted carrier signals, superposes the carrier signals subjected to multi-carrier filtering and frequency shifting processing, and conducts gain reduction on the carrier signals after superposition is completed.

8. A multi-carrier superposition device, comprising:
a controller that is configured to function as:
a superposition processing module that superposes the inputted carrier signals and conducts gain reduction processing during a superposition process;
a CFR processing module that conducts crest factor reduction (CFR) processing on the superposed carrier signals; and
an increase module that increases the carrier signals after CFR processing, to raise total power of the carrier signals,
wherein the superposition processing module conducts multi-carrier filtering and frequency shifting processing on the inputted carrier signals, superposes the carrier signals subjected to multi-carrier filtering and frequency shifting processing, and increases bit width of the carrier signals after superimposition is completed.

* * * * *